United States Patent [19]

Biwer

[11] Patent Number: 5,597,062
[45] Date of Patent: Jan. 28, 1997

[54] TENSIONED TRANSFER PLATE FOR SMALL PITCH CHAIN CONVEYOR

[75] Inventor: Martin R. Biwer, Greenfield, Wis.

[73] Assignee: Rexnord Corporation, Milwaukee, Wis.

[21] Appl. No.: 301,818

[22] Filed: Sep. 7, 1994

[51] Int. Cl.$^6$ .................................. B65G 47/66
[52] U.S. Cl. ........................................ 198/600
[58] Field of Search ............................... 198/600

[56] References Cited

U.S. PATENT DOCUMENTS

| | | | |
|---|---|---|---|
| 2,517,983 | 8/1950 | Crosland | 198/600 X |
| 2,536,961 | 1/1951 | Smith | 198/600 X |
| 2,624,444 | 1/1953 | Casabona | 198/600 X |
| 3,253,696 | 5/1966 | Szatkowski et al. | 198/600 X |
| 3,894,627 | 7/1975 | Jabbusch et al. | 198/600 X |
| 4,039,070 | 8/1977 | Harrison | 198/370 |
| 4,176,741 | 12/1979 | Vogel | 198/457 |
| 4,267,917 | 5/1981 | Vogel | 198/457 |
| 4,337,217 | 6/1982 | Braun | 261/112 |
| 4,429,780 | 2/1984 | Innes | 198/424 |
| 4,653,629 | 3/1987 | Born | 198/452 |
| 4,759,673 | 7/1988 | Pearce et al. | 198/600 X |
| 4,989,718 | 2/1991 | Steeber | 198/347.3 |
| 4,989,723 | 2/1991 | Bode et al. | 198/635 |
| 5,044,485 | 9/1991 | Loder | 198/600 X |
| 5,054,760 | 10/1991 | Reist | 198/600 X |
| 5,083,659 | 1/1992 | Bode et al. | 198/853 |
| 5,246,097 | 9/1993 | Roberts et al. | 198/457 |
| 5,277,296 | 1/1994 | McCoy et al. | 198/448 |

FOREIGN PATENT DOCUMENTS

| | | | |
|---|---|---|---|
| 134060 | 3/1985 | European Pat. Off. . | |
| 0134060 | 3/1985 | European Pat. Off. | 198/600 |
| 2303736 | 10/1976 | France . | |
| 1043208 | 4/1959 | Germany . | |
| 9212012 | 2/1993 | Germany . | |
| 690858 | 4/1953 | United Kingdom | 198/600 |
| 1352993 | 5/1974 | United Kingdom | 198/600 |

OTHER PUBLICATIONS

Rexnord Inc., Jan. 1985, Rex TableTop Chain Engineering Manual, pp. 77–79, 88, 106, 127.

*Primary Examiner*—D. Glenn Dayoan
*Attorney, Agent, or Firm*—Michael, Best & Friedrich

[57] ABSTRACT

The invention provides a conveying apparatus including a conveyor system supported on a conveyor frame. The conveyor system includes a pair of conveyor chains positioned in spaced apart end-to-end relation. The conveying apparatus also includes a transfer mechanism supported on the conveyor frame. The transfer mechanism includes a transfer plate for transferring articles between the conveyor chains. The transfer plate has a thin cross-section and is suspended in tension in the space between the conveyor chains and is supported only at its ends. The position of the transfer plate is also readily adjustable to suit a particular conveying application.

20 Claims, 4 Drawing Sheets

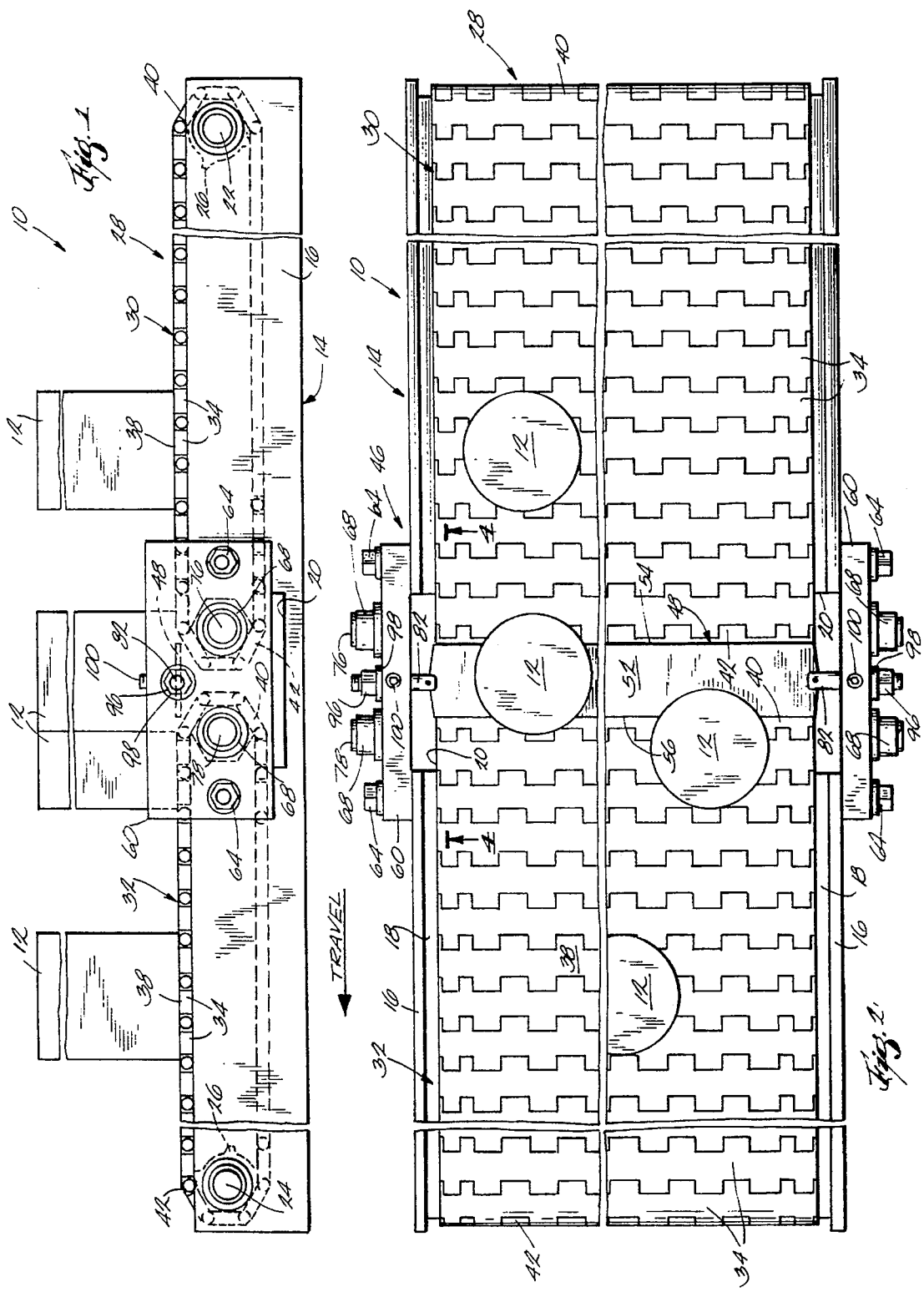

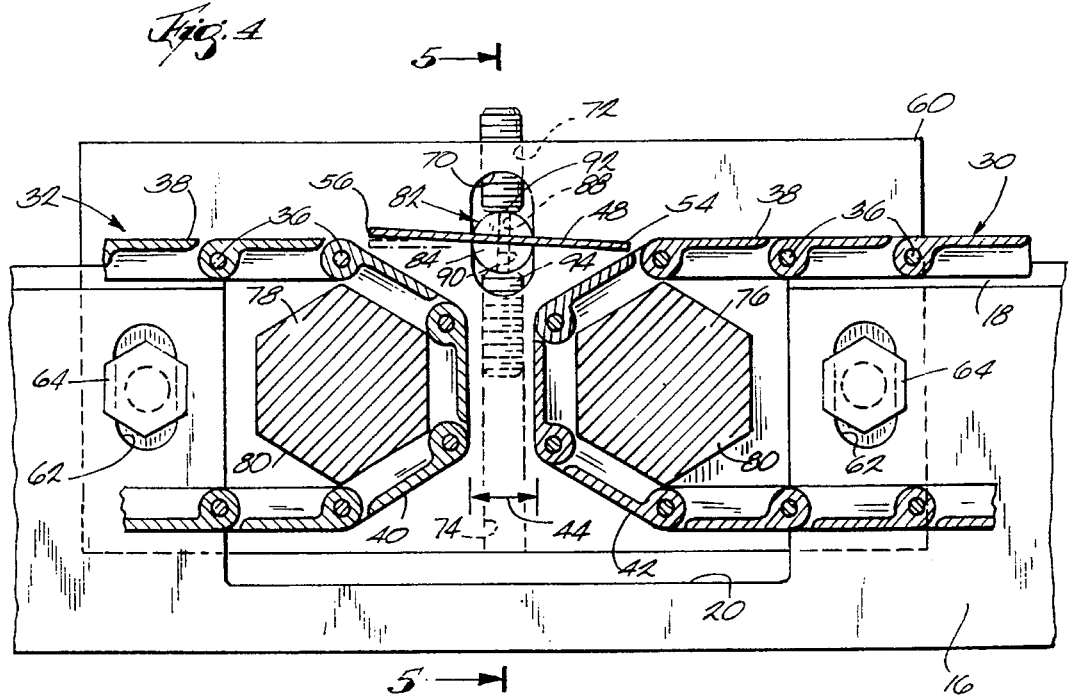

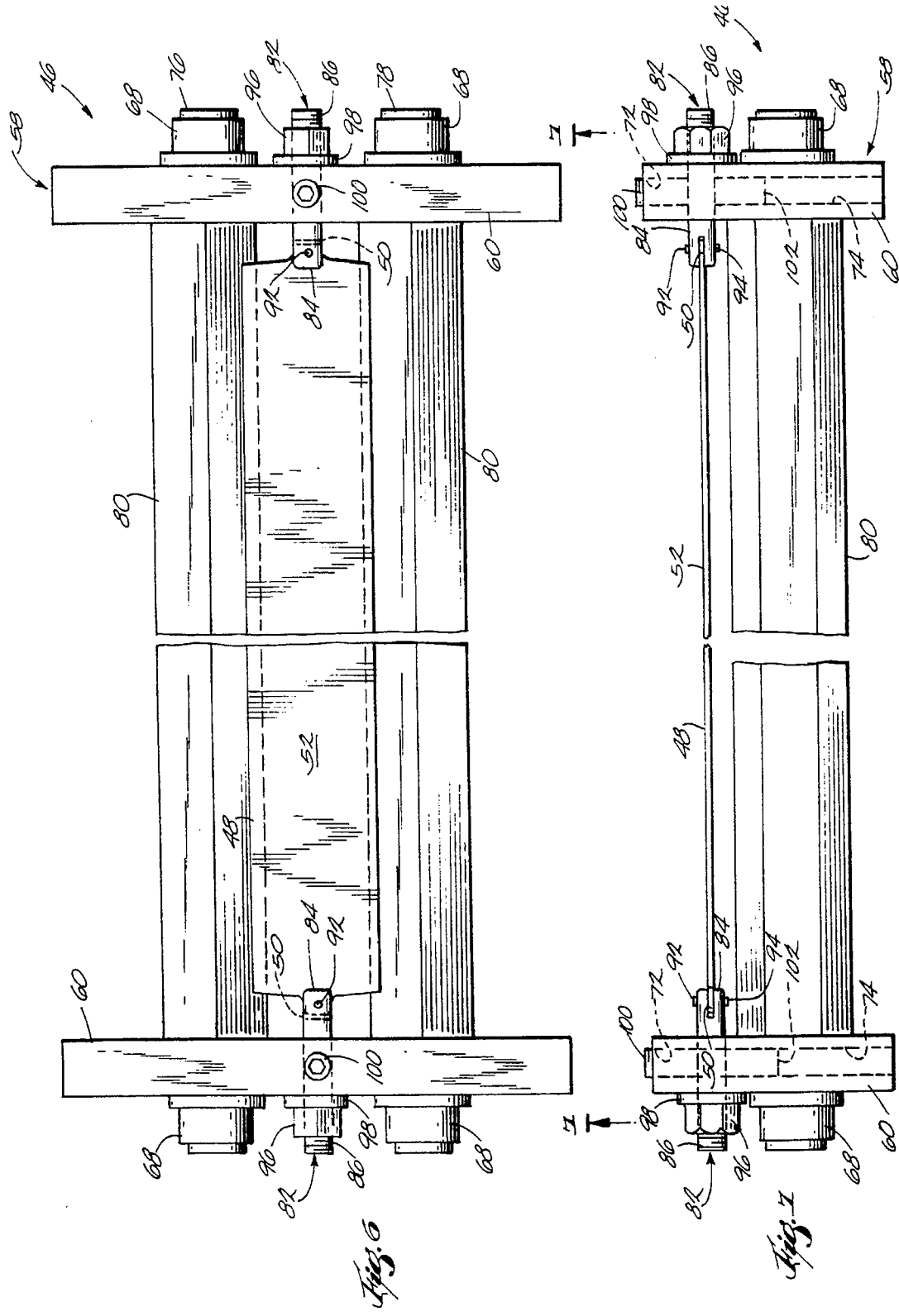

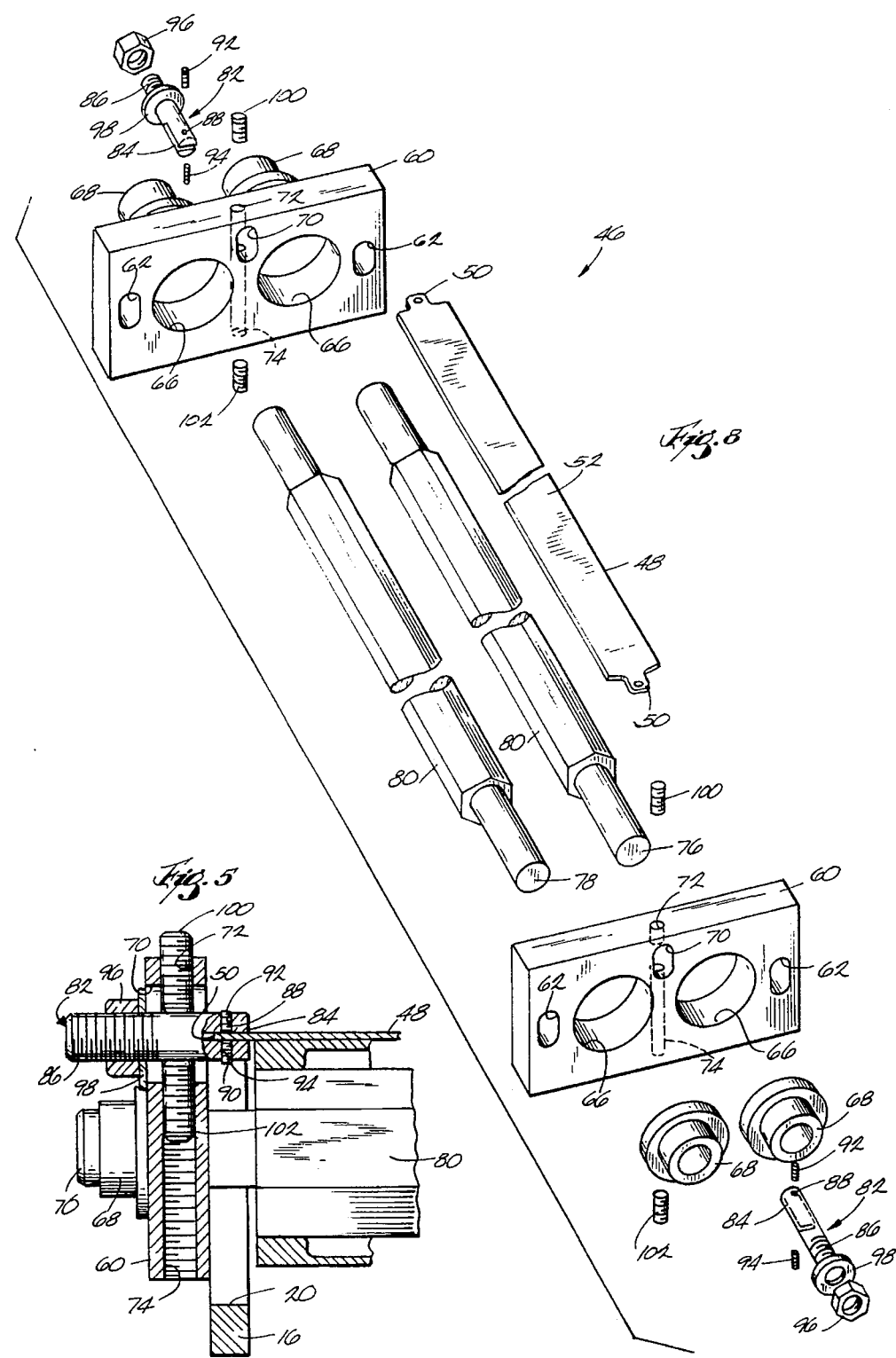

TENSIONED TRANSFER PLATE FOR SMALL PITCH CHAIN CONVEYOR

BACKGROUND OF THE INVENTION

1. Field of the Invention

The invention relates generally to conveying apparatus, and more particularly to mechanisms for transferring articles between separated article supporting surfaces, such as between two conveyor belts or chains.

2. Reference to Prior Art

Conveying equipment is used in various manufacturing, treatment and other processes for transporting articles. Known conveying equipment includes belts or chains that are supported on conveyor frames and that are constructed of chain links or modules interconnected by chain pins in an endless loop. Examples of such conveyor chains are manufactured by Rexnord Corporation, Milwaukee, Wis., the assignee of the present invention, and are sold under the brand names TableTop and MatTop. Those chains can be either side-flexing or straight running and are useful in carrying articles such as bottles, cans and packages in high production facilities.

Conveying equipment also often includes various mechanisms for changing the direction of conveyed articles or for transferring articles without worker assistance between a pair of conveyor chains or between a conveyor chain and a static article supporting surface. For example, turntable mechanisms and guides or fences are employed to transfer articles between conveyor chains traveling in different directions. Plates known as dead or transfer plates are also employed in conjunction with the fences or are used alone to transfer articles from one conveyor chain to another conveyor chain or other article supporting surface.

Using conventional equipment, articles that are susceptible to tipping can be difficult to transfer between conveyor chains or from a conveyor chain to a stationary article supporting surface. To partially address that problem, smaller pitched chains (i.e., chains having a pitch of about 1 inch or less) have been used to reduce chordal action (or chain link "kick-up") experienced by the chains as they round sprockets. This helps improve product transfer between conveyor chains arranged end-to-end or between a conveyor chain and a static support surface. However, even the use of small pitched chains has not fully eliminated conveying problems associated with articles that are particularly susceptible to tipping, such as empty drawn aluminum beverage cans.

SUMMARY OF THE INVENTION

The invention provides an article conveying apparatus having an improved mechanism for transferring articles between adjacent article conveying or supporting surfaces such as between a pair of conveyor chains. In one application, the improved transfer mechanism improves the transfer of articles susceptible to tipping by causing less disruption to the articles and by minimizing the amount of dead contact with the articles. The improved transfer mechanism is particularly suited for applications where the distances between article supporting surfaces are insufficient for conventional transfer equipment. Such an application exists, for example, with small pitched conveyor chains using smaller sprockets that allow the distance between the sprocket centerlines (and therefore the distance between the conveyor chains the sprockets support) to be minimized. While the improved transfer mechanism is readily adaptable for use in a variety of situations, it is well suited for use with small pitched conveyor chains arranged end-to-end.

The improved transfer mechanism includes an adjustable transfer plate for transfering articles smoothly between article supporting surfaces under a variety of conveying conditions. The transfer mechanism is easily incorporated or retrofitted into the frame of an existing conveyor system, and the transfer plate is supported only at its ends so that it is useable even in small spaces between article supporting surfaces. That is unlike known transfer plate constructions wherein the plate is supported at midspan locations by structure extending into the space between the article supporting surfaces.

Also, the transfer plate preferably has a thin cross-section, a narrow width, and is held in tension between adjacent article supporting surfaces. The size of the transfer plate makes it useful in small spaces, such as between a pair of small pitch conveyer chains, and also makes it more readily adjustable. The tension in the transfer plate keeps it from sagging even under the load of the articles and maintains the transfer plate in its desired position for optimum product transfer performance.

More particularly, the invention provides a conveying apparatus including a conveyor system supported on a frame and an article transfer mechanism. The transfer mechanism includes a transfer plate that is suspended in tension between spaced apart article supporting surfaces on the conveyor system to transfer articles between those surfaces. In one embodiment, the conveyor system includes a pair of conveyors positioned in end-to-end relation, to provide the article supporting surfaces. The transfer mechanism includes a pair of mounting members or blocks that are mountable on the opposite sides of the frame. The blocks are designed to support therebetween a pair of rotatable conveyor shafts that form support sprockets which in turn support the head and tail sections of the conveyors. The mounting blocks also support the transfer plate in tension in the space between the conveyors. The transfer plate has a thin cross-section and is supported only at its ends with no midspan support. This is beneficial when small pitch conveyor chains are employed since the distances between those chains can be minimized. To insure proper positioning of the transfer plate for the particular application, the transfer plate is adjustable to vary its angular position and its height relative to the conveyors. The tension in the transfer plate is also adjustable to accommodate the particular articles being conveyed.

The invention also provides an article conveying apparatus including a conveyor system which is supported on a frame and which in one embodiment includes first and second conveyor chains. The first and second conveyor chains are spaced apart in the lengthwise direction of the conveyor system and provide article supporting surfaces on which the articles are conveyed. The conveying apparatus also includes a pair of mounting blocks mounted opposite one another on opposite frame rails so that the blocks are spaced apart in a widthwise direction of the conveyor system. A pair of shafts are provided between the mounting blocks to support the head section of the first conveyor and the tail section of the second conveyor in closely spaced relation, and a transfer plate is also provided to transfer articles between the first and second conveyors. A pair of clamp members mounted on the mounting blocks hold the opposite end portions of the transfer plate to suspend the transfer plate in tension between the head section of the first conveyor and the tail section of the second conveyor. The clamp members are adjustable to vary the tension in the transfer plate and to vary the vertical and angular positions of the transfer plate.

Other features and advantages of the invention will become apparent to those skilled in the art upon review of the following detailed description, claims and drawings.

BRIEF DESCRIPTION OF THE DRAWINGS

FIG. 1 is a side elevational view of an article conveying apparatus which is shown broken in a lengthwise direction and which includes a transfer mechanism embodying the invention.

FIG. 2 is a top view of the article conveying apparatus which is shown broken in both lengthwise and widthwise directions.

FIG. 3 is a partially broken away and enlarged view of a portion of the conveyor apparatus illustrated in FIG. 2.

FIG. 4 is an enlarged cross-sectional view of part of the conveying apparatus taken along line 4—4 in FIG. 2.

FIG. 5 is a partially cross-sectional view taken along line 5—5 in FIG. 4.

FIG. 6 is an enlarged view of the transfer mechanism illustrated in FIG. 2.

FIG. 7 is a view of the transfer mechanism taken along line 7—7 in FIG. 6.

FIG. 8 is an exploded perspective view of the transfer mechanism illustrated in FIGS. 6 and 7.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF A PREFERRED EMBODIMENT

Illustrated in the drawings is a conveying apparatus 10 which embodies the invention. While the conveying apparatus 10 can be used in a wide range of applications to convey various articles, in the illustrated arrangement the conveying apparatus 10 is used to convey articles 12 such as drawn aluminum beverage cans which are empty and somewhat suspetible to tipping unless carefully handled.

As shown in FIGS. 1 and 2, the conveying apparatus 10 includes a frame 14 having opposite side rails 16. The side rails 16 include (see FIG. 4) chain supporting surfaces or wear strips 18, and in the illustrated arrangement the side rails 16 are provided with corresponding cut-outs or notches 20. The frame 14 also includes (FIG. 1) upstream and downstream shafts 22 and 24, respectively, each having toothed sprocket members 26 mounted thereon. In the illustrated arrangement the upstream and downstream shafts 22 and 24 are rotatably supported on the side rails 16 by bushings or bearings and are driven by a motor and drive belt (not shown) or other suitable drive means.

The conveying apparatus 10 also includes a conveyor system 28 for transporting the articles 12 down the path defined by the side rails 16. The conveyor system 28 includes an infeed or upstream conveyor chain 30 and an outfeed or downstream conveyor chain 32, and the upstream and downstream conveyor chains 30 and 32 are supported on the wear strips 18 of the side rails 16.

While the upstream and downstream conveyor chains 30 and 32 can be of any suitable construction, in the embodiment illustrated in the drawings both conveyor chains are straight running chains sold by Rexnord Corporation, Milwaukee, Wis. Suitable chains available from Rexnord are Model No. LF 5935 chain and Model No. WHT 6938 chain, both of which have a ¾ inch pitch. Briefly, each of the upstream and downstream conveyor chains 30 and 32 includes (FIG. 2) individual chain modules or links 34 arranged in intermeshing rows. The adjacent rows of chain links 34 are interconnected by (FIG. 3) elongated chain pins 36 to form endless loops (see FIG. 1) having upper runs that provide an article supporting surface 38 on which the articles 12 are conveyed.

With reference to FIGS. 1–4, the upstream and downstream conveyor chains 30 and 32 are positioned in end-to-end relation, and each includes a tail section 40 and a head section 42. The head section 42 of the upstream conveyor chain 30 and the tail section 40 of the downstream conveyor chain 32 are supported by the drive shafts 22 and 24, respectively. As shown in FIG. 4, head section 42 of the upstream conveyor chain 30 and tail section 40 of the downstream conveyor chain 32 are separated by a space 44 that extends in the lengthwise direction of the conveyor system 28. The space 44 is small (i.e. preferably less than 1 inch) and is generally only that necessary to prevent interference between the upstream and downstream conveyor chains 30 and 32.

The conveying apparatus 10 also includes a transfer mechanism 46 for transferring the articles 12 between the article supporting surfaces 38 of the upstream and downstream conveyor chains 30 and 32 as those articles 12 travel along the conveyor system 28. As shown in FIGS. 6–8, the transfer mechanism 46 includes a transfer member or plate 48 having opposite end portions or tabs 50. The transfer plate 48 also includes an unsupported midsection 52 having (FIG. 4) opposite leading and trailing edges 54 and 56 respectively.

In the illustrated arrangement, the transfer plate 48 has a thin cross-section (i.e., preferably about 0.030 inch thick) and a narrow width (i.e., about 1 inch) and is preferably made of steel and is hard chrome plated, although other materials such as a strip of banding steel can also be employed, if desired. As further explained below, the transfer plate 48 is supported in the space 44 between the upstream and downstream conveyor chains 30 and 32 and spans the width of the conveyor system 28 to facilitate the smooth transfer of articles 12 between the conveyor chains 30 and 32.

The transfer mechanism 46 also includes a mounting apparatus 58 for supporting the transfer plate 48. The mounting apparatus 58 forms part of the frame 14 when mounted thereon and includes a pair of mounting members or blocks 60. The mounting blocks 60 each include (FIG. 8) a pair of outer elongated slots 62, and suitable means such as fasteners 64 (See FIGS. 1–4) are provided to mount the blocks 60 on the opposite side rails 16. Before they are tightened, the fasteners 64 are slidable up and down in the slots 62 to permit vertical adjustment of the mounting blocks 60 relative to the side rails 16. As shown in FIG. 8, each of the mounting blocks 60 also includes a pair of circular openings 66 in which bushings or bearings 68 are mounted, a centrally located third elongated slot 70, and a pair of opposing tapped holes 72 and 74 communicating with slot 70.

The transfer mechanism 46 also includes a pair of shafts 76 and 78 that extend laterally between the mounting blocks 60 and that are rotatably supported in corresponding pairs of the bearings 68. The shafts 76 and 78 each have hexagonal sections 80 that act as idler sprocket members, and the shafts 76 and 78 support the head section 42 of the upstream conveyor chain 30 and the tail section 40 of the downstream conveyor chain 32, respectively. The mounting blocks 60 provide precise spacing between the shafts 76 and 78 and therefore control the size of the space 44 between the upstream and downstream conveyor chains 30 and 32. Additionally, the mounting blocks 60 are positioned so that the shafts 76 and 78 extend through the notches 20 in the side rails 16, and the vertical positions of the shafts 76 and 78 can be adjusted by moving the mounting blocks 60.

The transfer mechanism 46 also includes means for suspending the transfer plate 48 in tension between the upstream and downstream conveyor chains 30 and 32. While various means for suspending the transfer plate 48 can be employed, in the illustrated arrangement such means includes plate holding or clamping members 82. Each of the clamping members 82 includes a spring clip or slotted portion 84 that receives one of the tabs 50 on the transfer plate 48 and a threaded portion 86 that extends through slot 70 in one of the mounting blocks 60. Each slotted portion 84 is provided with opposed through holes 88 and 90 that each extend radially from the outer surface of the slotted portion 84 and at right angles to the slot in portion 84.

To attach the transfer plate 48 to the clamping members 82, the slotted portion 84 of each clamping member 82 is provided with threaded fasteners 92 and 94 such as roll pins. As shown in FIG. 5 with respect to one of the clamping members 82, fastener 92 is threaded into hole 88 and fastener 94 is threaded into hole 90. To secure the tabs 50 in place, the fasteners 92 and 94 of each clamping member 82 are tightened.

The aforementioned means for suspending the transfer plate 48 also includes means for adjusting tension in the transfer plate 48. In the illustrated arrangement the means for adjusting tension includes the threaded portions 86 of the clamping members 82 and a pair of nuts 96 (and washers 98) each threaded onto one of the threaded portions 86. The nuts 96 secure the clamping members 82 in place on the mounting blocks 60, and tension in the transfer plate 48 is adjusted by tightening or loosening the nuts 96.

The transfer mechanism 46 is also provided with means for adjusting the position of the transfer plate 48 relative to the article supporting surfaces 38 of the upstream and downstream conveyor chains 30 and 32. In the particular arrangement illustrated in the drawings the means for adjusting the position of the transfer plate 48 includes slots 70, first adjusters such as top adjustment screws 100, and second adjusters such as bottom adjustment screws 102. In the illustrated embodiment the top and bottom adjustment screws 100 and 102 are hex socket set screws that are engageable with the clamping members 82. As shown FIG. 5, each top adjustment screw 100 is threaded into the upper tapped hole 72 in one of the mounting blocks 60 and each bottom adjustment screw 102 is threaded into the lower tapped hole 74 in one of the mounting blocks 60.

The top and bottom adjustment screws 100 and 102 in each mounting block 60 cooperate with one another to secure one of the clamping members 82 in position thereon. Since the clamping members 82 are both slidable and rotatable within their slots 70, both the vertical position and the angular position of the transfer plate 48 relative to the article supporting surfaces 38 of the upstream and downstream conveyor chains 30 and 32 are adjustable. Adjustment is accomplished by manipulating the top and bottom adjustment screws 100 and 102 and the clamping members 82. Thus, slots 70 and the top and bottom adjustment screws 100 and 102 function both as a means for raising and lowering the transfer plate 48 and as a means for adjusting the angular position of the transfer plate 48.

In particular, to adjust the vertical position of the transfer plate 48 the clamping members 82 are adjusted upwardly or downwardly within slots 70. To do this one or both of the top and bottom adjustment screws 100 and 102 corresponding to each clamping member 82 are loosened to permit the clamping member 82 to slide up and/or down. When the clamping members 82 are positioned to hold the transfer plate at the desired level, the top and/or bottom adjustment screws 100 and 102 are tightened. To change the angular position of the transfer plate 48, the clamping members 82 are pivoted before the top and/or bottom adjustment screws 100 and 102 are tightened.

As shown in FIG. 4, the transfer plate 48 is in a slightly angled position. In that position the leading edge 54 of the transfer plate 48 is slightly below the plane containing the article supporting surfaces 38 of the upstream and downstream conveyor chains 30 and 32 and its trailing edge 56 is slightly above that plane. As an article 12 reaches the transfer plate 48 (i.e., travelling from right to left as seen in FIGS. 1 and 2), the leading portion of the article 12 drops slightly to the transfer plate 48 and then follows the inclination of the transfer plate 48. As the leading portion of the article 12 passes the trailing edge 56 of the transfer plate 48 it drops slightly to the downstream conveyor chain 32 before continuing its downstream path.

While in the illustrated embodiment the transfer plate 48 is shown in a slightly inclined position, it can also be horizontally positioned (as shown by hidden lines in FIG. 4), if desired. When the transfer plate 48 is horizontal the conveyor system 28 can be operated in either direction (i.e., with reference to FIGS. 1 and 2, right to left or left to right) and the articles 12 will be transferred smoothly between the conveyor chains 30 and 32 in either case.

Various features of the invention are set forth in the following claims.

I claim:

1. A conveying apparatus comprising a frame, a conveyor system supported on the frame, the conveyor system including a pair of spaced apart article supporting surfaces, and a transfer mechanism supported on the frame, the transfer mechanism including a transfer plate for transferring articles between the spaced apart articles supporting surfaces, spaced apart support means mounted on the frame, each support means including holding means for supportingly engaging the opposite ends of the transfer plate and for suspending the transfer plate in the space between the article supporting surfaces, at least one of said holding means including means for adjusting the tension in said transfer plate.

2. A conveying apparatus as set forth in claim 1 wherein said support means includes adjustable means for adjusting the position of the transfer plate with respect to the article supporting surfaces.

3. A conveying apparatus as set forth in claim 1 wherein said support means includes means for adjusting the angular position of the transfer plate with respect to the article supporting surfaces.

4. A conveying apparatus as set forth in claim 1 wherein said support means includes means for raising and lowering the transfer plate relative to the article supporting surfaces.

5. A conveying apparatus as set forth in claim 1 wherein the frame includes opposite sides, wherein the spaced apart support means comprises a pair of spaced apart mounting members mounted on the opposite sides of the frame, the transfer plate being mounted between the mounting members, and wherein the transfer plate includes opposite end portions each supported by one of the mounting members, and an unsupported midsection, the midsection spanning at least most of the space between the mounting members.

6. A conveying apparatus as set forth in claim 5 wherein the conveyor system includes a first conveyor, the first conveyor including one of the article supporting surfaces, and a head section, and a second conveyor, the second conveyor including the other of the article supporting surfaces, and a tail section, and wherein the transfer mechanism includes a pair of sprocket members, each of the sprocket members being supported between the mounting members, one of the sprocket members supporting the head section of the first conveyor, and the other of the sprocket members supporting the tail section of the second conveyor.

7. A conveying apparatus as set forth in claim 6 wherein the frame includes opposite rails, and means for mounting the mounting members on the opposite rails so that the position of the mounting members with respect to the opposite rails is adjustable.

8. A conveying apparatus comprising a frame, a first conveyor supported on the frame, a second conveyor supported on the frame, the second conveyor being spaced from the first conveyor, a transfer member for transferring articles between the first and second conveyors, and means supported on the frame for suspending the transfer member in tension in the space between the first and second conveyors, said transfer member including opposite end portions and an unsupported midsection between the end portions, said means for suspending the transfer member including a pair of holding members for holding one of the end portions of the transfer member, and at least one of the holding means being adjustable to vary the tension in the transfer member.

9. A conveying apparatus as set forth in claim 8 wherein the means for suspending the transfer member is adjustable to reposition the transfer member with respect to the first and second conveyors.

10. A conveying apparatus as set forth in claim 8 wherein the first and second conveyors are positioned in end-to-end relation and the transfer member is positioned between the ends of the first and second conveyors.

11. A conveying apparatus as set forth in claim 8 wherein the first conveyor includes a head section, and the second conveyor includes a tail section spaced from the head section of the first conveyor, wherein the transfer member is positioned between the head section of the first conveyor and the tail section of the second conveyor, wherein the means for suspending the transfer member includes a pair of spaced apart mounting members forming part of the frame, and wherein the frame includes a pair of sprocket members, each of the sprocket members being supported between the mounting members, one of the sprocket members supporting the head section of the first conveyor, and the other of the sprocket members supporting the tail section of the second conveyor.

12. A conveying apparatus comprising a frame, a first conveyor supported on the frame, a second conveyor supported on the frame, the second conveyor being spaced from the first conveyor, a transfer member for transferring articles between the first and second conveyors, and means supported on the frame for suspending the transfer member in tension in the space between the first and second conveyors, the transfer member includes opposite end portions and an unsupported midsection between the end portions, wherein the means for supporting the transfer member includes a pair of holding members, each of the holding members being mounted on the frame, each of the holding members holding one of the end portions of the transfer member, and at least one of the holding members being adjustable to vary the tension in the transfer member.

13. A conveying apparatus as set forth in claim 12 wherein the holding members are moveable relative to the frame to adjust the position of the transfer member with respect to the first and second conveyors.

14. A transfer apparatus for use with a conveyor system for transferring articles from the article supporting surface of a conveyor chain to another article supporting surface, the transfer apparatus comprising a transfer plate including opposite end portions, and a midsection extending between the opposite end portions, and a pair of plate holding members, each of the plate holding members being supportable on the conveyor system, each of the plate holding members holding one of the end portions of the transfer plate to suspend the transfer plate in tension between the mounting members with the midsection of the transfer plate being unsupported, and at least one of the plate holding members being adjustable to vary the tension in the transfer plate.

15. A transfer apparatus as set forth in claim 14 wherein the midsection of the transfer plate has a thin cross-section such that tension in the transfer plate is required to keep the midsection of the transfer plate from sagging below a plane containing the end portions of the transfer plate.

16. A transfer apparatus as set forth in claim 14 and including a pair of mounting members each attachable as part of a frame of the conveyor system, each of the mounting members including a slot, wherein the plate holding members are received in the slots in the mounting members, wherein the plate holding members are slidable within the slots to raise and lower the transfer plate relative to the mounting members, and wherein the plate holding members are rotatable within the slots to change the angular position of the transfer plate relative to the mounting members.

17. A transfer apparatus as set forth in claim 14 and including a pair of mounting members each attachable as part of a frame of the conveyor system, and a shaft rotatably supported between the mounting members, the shaft being constructed and arranged to support the conveyor chain, and wherein each of the plate holding members is mounted on one of the mounting members.

18. An article conveying apparatus comprising a frame including opposite rails, a conveyor system supported on the frame, the conveyor system including a first conveyor, the first conveyor including an article supporting surface, and a head section, and a second conveyor, the second conveyor including an article supporting surface, and a tail section, the head section of the first conveyor and the tail section of the second conveyor being spaced apart in a lengthwise direction of the conveyor system, a pair of mounting blocks mounted opposite one another on the opposite rails, the mounting blocks being spaced apart in a widthwise direction of the conveyor system, a pair of shafts supported between the mounting blocks, one of the shafts supporting the head section of the first conveyor, and the other of the shafts supporting the tail section of the second conveyor, a transfer plate including opposite end portions, and an unsupported midsection extending between the opposite end portions, a pair of clamp members, the clamp members being mounted on the mounting blocks, the clamp members each holding one of the opposite end portions of the transfer plate, the clamp members suspending the transfer plate in tension between the head section of the first conveyor and the tail section of the second conveyor to transfer articles between the first and second conveyors, and the clamp members being adjustable to vary the tension in the transfer plate and to vary the vertical and angular positions of the transfer plate.

19. A conveying apparatus comprising a frame, a conveyor system supported on the frame, the conveyor system including a pair of spaced apart article supporting surfaces, and a transfer mechanism supported on the frame, the transfer mechanism including a transfer plate for transferring articles between the spaced apart article supporting surfaces, the transfer plate being suspended in tension in the space between the article supporting surfaces, said frame including opposite sides, said transfer mechanism including a pair of spaced apart mounting members mounted on the opposite sides of the frame, said transfer plate including opposite end portions, a pair of clamping members each supported on one of the mounting members, each of the clamping members holding one of the end portions of the transfer plate to support said transfer plate therebetween, each of the clamping members being adjustable to reposition the transfer plate with respect to the article supporting surfaces, the midsection of said transfer plate being unsupported and spanning at least most of the space between the mounting members.

20. A conveying apparatus comprising a frame, a conveyor system supported on the frame, the conveyor system including a pair of spaced apart article supporting surfaces, and a transfer mechanism supported on the frame, the transfer mechanism including a transfer plate for transferring articles between the spaced apart article supporting surfaces, the transfer plate being suspended in tension in the space between the article supporting surfaces, said frame including opposite sides, said transfer mechanism including a pair of spaced apart mounting members mounted on the opposite sides of the frame, said transfer plate including opposite end portions, a pair of clamping members each supported on one of the mounting members, each of the clamping members holding one of the end portions of the transfer plate, and at least one of the clamping members being adjustable to change the tension in the transfer plate, the midsection of said transfer plate being unsupported and spanning at least most of the space between the mounting members.

* * * * *